United States Patent
Schmieg et al.

(10) Patent No.: US 8,713,914 B2
(45) Date of Patent: May 6, 2014

(54) METHOD AND APPARATUS FOR MONITORING A HYDROCARBON-SELECTIVE CATALYTIC REDUCTION DEVICE

(75) Inventors: Steven J. Schmieg, Troy, MI (US); Michael B. Viola, Macomb Township, MI (US); Shi-Wai S. Cheng, Troy, MI (US); Patricia A. Mulawa, Clinton Township, WI (US); David L. Hilden, Shelby Township, MI (US); Thompson M. Sloane, Oxford, MI (US); Jong H. Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 792 days.

(21) Appl. No.: 12/568,754

(22) Filed: Sep. 29, 2009

(65) Prior Publication Data
US 2011/0072790 A1 Mar. 31, 2011

(51) Int. Cl.
*F01N 3/00* (2006.01)
(52) U.S. Cl.
USPC .................... 60/277; 60/274; 60/285; 60/286; 60/299
(58) Field of Classification Search
USPC ........... 60/285, 286, 294, 295, 300, 301, 303, 60/274, 277, 299
See application file for complete search history.

(56) References Cited

U.S. PATENT DOCUMENTS

| | | | |
|---|---|---|---|
| 6,990,800 B2 * | 1/2006 | van Nieuwstadt et al. | 60/277 |
| 7,797,927 B2 * | 9/2010 | Nagaoka et al. | 60/277 |
| 8,051,641 B2 * | 11/2011 | Kako et al. | 60/285 |
| 2004/0040289 A1 * | 3/2004 | Mazur et al. | 60/295 |
| 2004/0144085 A1 * | 7/2004 | Surnilla et al. | 60/295 |
| 2007/0256405 A1 * | 11/2007 | Gabe et al. | 60/274 |
| 2010/0047133 A1 * | 2/2010 | Kako et al. | 422/105 |
| 2010/0139249 A1 * | 6/2010 | Alm et al. | 60/285 |

* cited by examiner

*Primary Examiner* — Kenneth Bomberg
*Assistant Examiner* — Jason Sheppard (57) ABSTRACT

A method for monitoring a hydrocarbon-selective catalytic reactor device of an exhaust aftertreatment system of an internal combustion engine operating lean of stoichiometry includes injecting a reductant into an exhaust gas feedstream upstream of the hydrocarbon-selective catalytic reactor device at a predetermined mass flowrate of the reductant, and determining a space velocity associated with a predetermined forward portion of the hydrocarbon-selective catalytic reactor device. When the space velocity exceeds a predetermined threshold space velocity, a temperature differential across the predetermined forward portion of the hydrocarbon-selective catalytic reactor device is determined, and a threshold temperature as a function of the space velocity and the mass flowrate of the reductant is determined. If the temperature differential across the predetermined forward portion of the hydrocarbon-selective catalytic reactor device is below the threshold temperature, operation of the engine is controlled to regenerate the hydrocarbon-selective catalytic reactor device.

11 Claims, 7 Drawing Sheets

METHOD AND APPARATUS FOR MONITORING A HYDROCARBON-SELECTIVE CATALYTIC REDUCTION DEVICE

GOVERNMENT CONTRACT RIGHTS

The U.S. Government has a paid-up license in this invention and the right in limited circumstances to require the patent owner to license others on reasonable terms as provided for by the terms of DE-FC26-02NT41218 awarded by the U.S. Department of Energy.

TECHNICAL FIELD

This disclosure relates to exhaust aftertreatment systems, and more specifically to exhaust aftertreatment systems for engines operating lean of stoichiometry.

BACKGROUND

The statements in this section merely provide background information related to the present disclosure and may not constitute prior art.

Known internal combustion engines operating at lean air-fuel ratios can reduce fuel consumption with decreased NOx emissions. Known exhaust aftertreatment systems for internal combustion engines operating lean of stoichiometry can include an oxidation catalytic converter, a lean-NOx reduction catalyst, also referred to as a NOx adsorber, a selective catalytic reduction (SCR) catalytic device, and a particulate filter. Known SCR devices promote catalytic reaction of NOx with a reductant, e.g., hydrocarbon, to produce nitrogen and water. Reductant is dispensed into an exhaust gas feedstream upstream of the SCR device.

A known scheme to reduce NOx emissions includes injecting hydrocarbons upstream of a hydrocarbon-selective catalytic reduction (HC-SCR) device with an exhaust gas feedstream that is oxygen-rich. One HC-SCR device includes using a catalyst including alumina-supported silver, e.g., $Ag/Al_2O_3$, to selectively reduce NOx under lean exhaust conditions using hydrocarbon as a reductant. Known hydrocarbon reductants include short-chain hydrocarbons (e.g., propene, propane) and long-chain hydrocarbons (e.g., octane, decane). NOx reduction strategies using short-chain hydrocarbons present in engine exhaust as a reductant for reducing NOx emissions at higher temperatures are known. NOx reduction strategies using long-chain hydrocarbons and oxygenated hydrocarbons (e.g., ethanol) present in engine exhaust as reductants to reduce NOx emissions at lower temperatures are known.

Systems using NOx adsorbers can require catalytic devices having large displaced volumes and large masses of platinum-group metals coupled with use of low sulfur fuel to operate efficiently. Known NOx adsorbers require periodic catalyst regeneration that can include injecting fuel into the exhaust gas feedstream to generate high exhaust gas temperatures and dispensing reductants to regenerate the storage material of the catalyst.

SUMMARY

A method for monitoring a hydrocarbon-selective catalytic reactor device of an exhaust aftertreatment system of an internal combustion engine operating lean of stoichiometry includes injecting a reductant into an exhaust gas feedstream upstream of the hydrocarbon-selective catalytic reactor device at a predetermined mass flowrate of the reductant, and determining a space velocity associated with a predetermined forward portion of the hydrocarbon-selective catalytic reactor device. When the space velocity exceeds a predetermined threshold space velocity, a temperature differential across the predetermined forward portion of the hydrocarbon-selective catalytic reactor device is determined, and a threshold temperature as a function of the space velocity and the mass flowrate of the reductant is determined If the temperature differential across the predetermined forward portion of the hydrocarbon-selective catalytic reactor device is below the threshold temperature, operation of the engine is controlled to regenerate the hydrocarbon-selective catalytic reactor device.

BRIEF DESCRIPTION OF THE DRAWINGS

One or more embodiments will now be described, by way of example, with reference to the accompanying drawings, in which.

DETAILED DESCRIPTION

Figure 1:
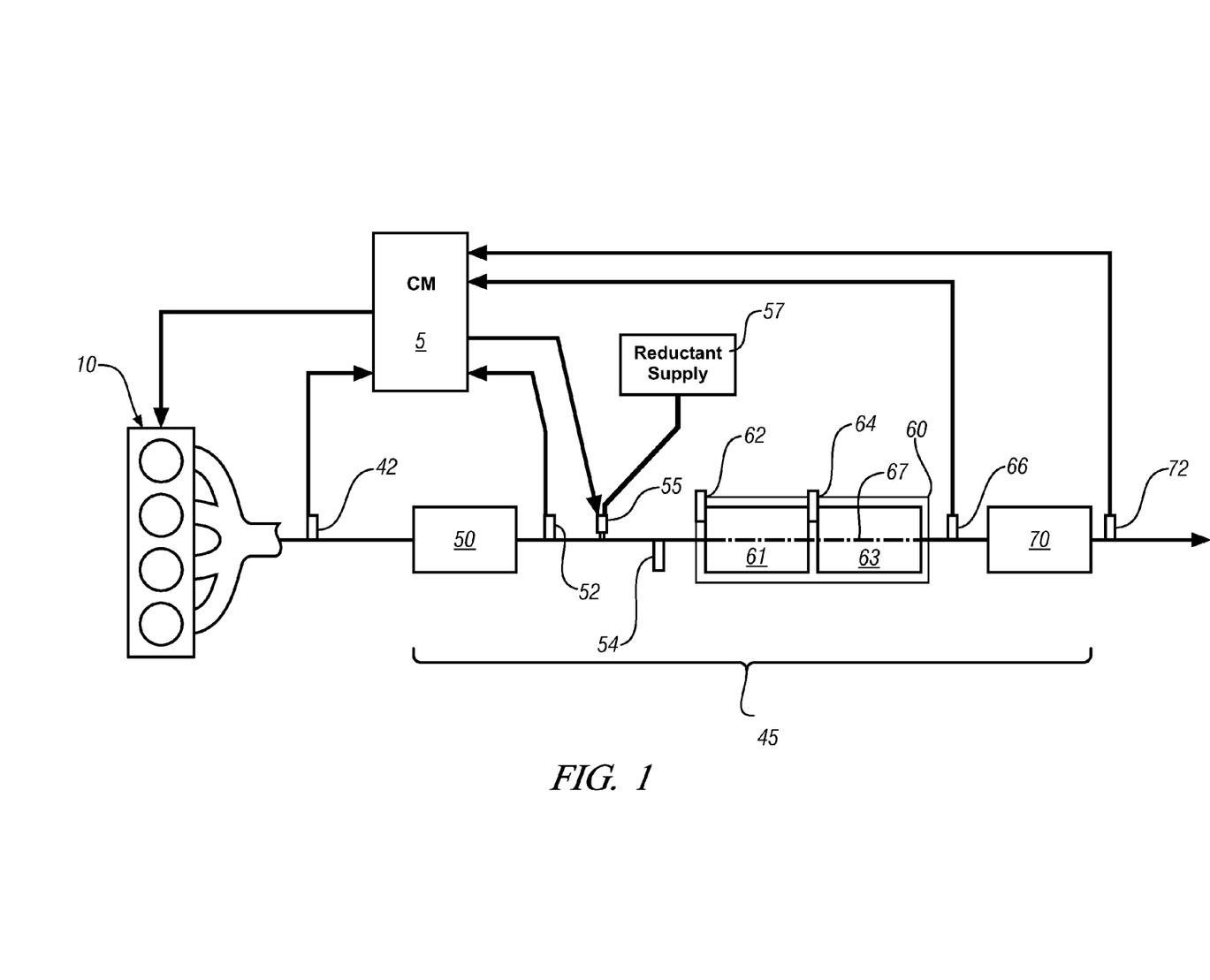
FIG. 1 is a two-dimensional schematic diagram of an engine and exhaust aftertreatment system in accordance with the present disclosure.

Referring now to the drawings, wherein the showings are for the purpose of illustrating certain exemplary embodiments only and not for the purpose of limiting the same, FIG. 1 schematically illustrates an internal combustion engine 10, an aftertreatment system 45, and an accompanying control system including a control module 5 (CM) that have been constructed in accordance with an embodiment of the disclosure. One exemplary engine 10 is a multi-cylinder direct-injection four-stroke internal combustion engine that operates primarily at a lean air-fuel ratio. The exemplary engine 10 can include a compression-ignition engine, a spark-ignition direction-injection engine, and other engine configurations that operate using a combustion cycle that includes lean air-fuel ratio operation.

The engine 10 is equipped with various sensing devices that monitor engine operation, including an exhaust gas sensor 42 adapted to monitor the exhaust gas feedstream. The exhaust gas sensor 42 preferably is a device operative to generate an electrical signal correlatable to air-fuel ratio of the exhaust gas feedstream, from which oxygen content can be determined Alternatively or in addition, the exhaust gas sensor 42 can be a device operative to generate an electrical signal correlatable to a parametric state of NOx concentration in the exhaust gas feedstream. Alternatively, a virtual sensing device executed as an algorithm in the control module 5 can be used as a substitute for the exhaust gas sensor 42, wherein NOx concentration in the exhaust gas feedstream is estimated based upon engine operating conditions monitored using other sensing devices. The engine 10 is preferably equipped with a mass airflow sensor to measure intake mass airflow (e.g., in g/s), and thus exhaust mass airflow. Alternatively or in combination, an algorithm can be executed to determine mass airflow through the engine 10 based upon engine rotational speed, displacement, and volumetric efficiency.

The control system includes the control module 5 that is signally connected to a plurality of sensing devices operative to monitor the engine 10, the exhaust gas feedstream, and the exhaust aftertreatment system 45. The control module 5 is operatively connected to actuators of the engine 10 and the exhaust aftertreatment system 45. The control system executes control schemes, preferably including control algorithms and calibrations stored in the control module 5, to control the engine 10 and the exhaust aftertreatment system 45. In operation one control scheme includes monitoring operation of the internal combustion engine 10 and elements of the exhaust aftertreatment system 45, controlling reductant dispensing as described herein, and commanding regenerative operation to regenerate specific devices of the exhaust aftertreatment system 45.

The control module 5 preferably is a general-purpose digital computer including a microprocessor or central processing unit, storage mediums including non-volatile memory including read only memory and electrically programmable read only memory, random access memory, a high speed clock, analog to digital conversion circuitry and digital to analog circuitry, and input/output circuitry and devices, and appropriate signal conditioning and buffer circuitry. The control module 5 executes the control algorithms to control operation of the engine 10. The control algorithms are resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control routines and diagnostic routines to control and monitor operation of the engine 10, the aftertreatment system 45, and the actuators, including using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event. The engine 10 is controlled to operate at a preferred air-fuel ratio to achieve performance parameters related to operator requests, fuel consumption, emissions, and drivability, with engine fueling and/or the intake mass airflow controlled to achieve the preferred air-fuel ratio.

The exhaust aftertreatment system 45 is fluidly coupled to an exhaust manifold of the engine 10 to entrain the exhaust gas feedstream. The exhaust aftertreatment system 45 includes a plurality of aftertreatment devices fluidly connected in series. In one embodiment, shown in FIG. 1, there are first, second, and third aftertreatment devices 50, 60 and 70. The aftertreatment devices 50, 60 and 70 are fluidly connected in series using known pipes and connectors. Each of the exhaust aftertreatment devices 50, 60 and 70 is a device which employs technologies having various capabilities for treating the constituent elements of the exhaust gas feedstream, including oxidation, selective catalytic reduction using a reductant, and particulate filtering. Design features for each of the aftertreatment devices 50, 60 and 70, e.g., volume, space velocity, cell density, washcoat density, and metal loading can be determined for specific applications. In the embodiment shown in FIG. 1, the first aftertreatment device 50 is an oxidation catalyst, the second aftertreatment device 60 is the hydrocarbon-selective catalytic reactor device, and the third aftertreatment device 70 is a catalyzed particulate filter, although the concepts described herein are not so limited. The first, second, and third aftertreatment devices 50, 60 and 70 can be assembled into individual structures that are fluidly connected and assembled in an engine compartment and a vehicle underbody with one or more sensing devices placed therebetween. One skilled in the art can conceive of other assembly configurations.

The first aftertreatment device 50 preferably is an oxidation catalytic device that includes a cordierite substrate having an alumina-based washcoat containing one or more platinum-group metals, e.g., platinum or palladium. In one embodiment, the first aftertreatment device 50 may be omitted.

The second aftertreatment device 60 is a hydrocarbon-selective catalytic reactor device in one embodiment, preferably including a cordierite substrate coated with a washcoat. In one embodiment, the second aftertreatment device 60 includes first and second coated substrates 61 and 63 arranged in series relative to a longitudinal axis 67 corresponding to direction of flow of the exhaust gas feedstream. The preferred washcoat uses silver-alumina (Ag—Al) as the catalytic material and includes 2 wt. % $Ag_2O$ supported on alumina in one embodiment.

The third aftertreatment device 70 preferably is a second oxidation catalyst combined with a particulate filter. The third aftertreatment device 70 can include, singly or in combination other exhaust aftertreatment devices including catalyzed or uncatalyzed particulate filters, air pumps, external heating devices, sulfur traps, phosphorous traps, selective reduction devices, and others, according to specifications and operating characteristics of a specific engine and powertrain application.

The exhaust aftertreatment system 45 includes a reductant dispensing device 55 having a dispensing mechanism and a nozzle that are fluidly connected to a reductant supply system (Reductant Supply) 57 that preferably contains a hydrocarbon reductant. In one embodiment, supply of the hydrocarbon reductant can originate with a fuel tank that contains fuel for powering the internal combustion engine 10. In another embodiment, the reductant supply system 57 can include a separate reservoir that stores reductant materials for dispensing into the exhaust gas feedstream via the reductant dispensing device 55. The nozzle of the reductant dispensing device 55 is inserted into the exhaust system 45 upstream of the hydrocarbon-selective catalytic reactor device 60. The reductant dispensing device 55 is controlled by the control module 5 to dispense the hydrocarbon reductant into the exhaust gas feedstream at a commanded mass flowrate. Alternatively, the reductant dispensing device 55 and reductant supply system 57 may be omitted and the hydrocarbon-reductant can be dispensed by controlling engine fuel injectors to inject fuel into engine combustion chambers during an exhaust stroke of the engine cycle.

Sensing devices include those configured to monitor constituents of the exhaust gas feedstream as it passes through the exhaust aftertreatment system 45, and may include the exhaust gas sensor 42, a first sensing device 52 immediately downstream of the first aftertreatment device 50, a second sensing device 54 immediately upstream of the hydrocarbon-selective catalytic reactor device 60, a third sensing device 66 downstream of the hydrocarbon-selective catalytic reactor device 60, and a fourth sensing device 72 downstream of the third aftertreatment device 70. Sensing devices further include first and second temperature monitoring sensors 62 and 64 configured to monitor temperatures related to the hydrocarbon-selective catalytic reactor device 60. The location of the first and second temperature monitoring sensors 62 and 64 define a monitored portion of the hydrocarbon-selective catalytic reactor device 60, preferably described relative to the longitudinal axis 67 thereof.

The first sensing device 52 is located upstream of the second aftertreatment device 60, and monitors the exhaust gas feedstream downstream of the first aftertreatment device 50. The first sensing device 52 generates a signal correlatable to a constituent of the exhaust gas feedstream, e.g., NOx concentration, upstream of the reductant dispensing system 55 and the hydrocarbon-selective catalytic reactor device 60. The first sensing device 52 may be omitted in some embodiments.

The second sensing device 54 is located immediately upstream of the hydrocarbon-selective catalytic reactor device 60 and downstream of the reductant dispensing system 55. The second sensing device 54 generates a signal correlatable to a concentration of a specific gas, e.g., NOx, hydrocarbons species, hydrogen cyanide, and/or acetaldehyde contained in the exhaust gas feedstream subsequent to exiting the first aftertreatment device 50. The second sensing device 54 may be omitted in some embodiments.

The third sensing device 66 is located downstream of the hydrocarbon-selective catalytic reactor device 60 and upstream of the third aftertreatment device 70. The third sensing device 66 preferably generates a signal correlatable to a concentration of a specific gas, e.g., NOx, hydrocarbons species, hydrogen cyanide, and/or acetaldehyde contained in the exhaust gas feedstream subsequent to exiting the second aftertreatment device 60. In one embodiment, the third sensing device 66 can include a virtual sensing device executed as an algorithm in the control module 5 that can be used as a substitute for the exhaust gas sensor 42, wherein NOx concentration in the exhaust gas feedstream is determined based upon engine operating conditions monitored using other sensing devices.

The fourth sensing device 72 is located downstream of the third aftertreatment device 70. The fourth sensing device 72 preferably generates a signal correlatable to concentrations of specific gases in the exhaust gas feedstream, e.g., NOx, hydrocarbons species, hydrogen cyanide, and/or acetaldehyde contained in the exhaust gas feedstream subsequent to exiting the third aftertreatment device 70. Each of the first, second, third, and fourth sensing devices 52, 54, 66 and 72 are signally connected to the control module 5, and can be used for control, monitoring, and diagnostics by system control algorithms and diagnostic algorithms.

The first and second temperature monitoring sensors 62 and 64 preferably monitor temperatures at a forward position and a rearward position of the hydrocarbon-selective catalytic reactor device 60 respectively, with the forward and rearward positions defined along the longitudinal flow axis 67 thereof and relative to the exhaust gas feedstream. Signal outputs from the first and second temperature monitoring sensors 62 and 64 are used to determine a temperature differential $\Delta T$ across the monitored portion of the hydrocarbon-selective catalytic reactor device 60. The first temperature monitoring sensor 62 measures temperature upstream of or within a front location of the hydrocarbon-selective catalytic reactor device 60 to determine a temperature thereof The first temperature monitoring sensor 62 can be configured to monitor temperature of the exhaust gas feedstream. Alternatively, the first temperature monitoring sensor 62 can be configured to monitor temperature at a front location in the first coated substrate 61 of the hydrocarbon-selective catalytic reactor device 60, e.g., within 2-3 cm of the front of the first coated substrate 61 of the hydrocarbon-selective catalytic reactor device 60. The second temperature monitoring sensor 64 is inserted at a middle or rearward position in the hydrocarbon-selective catalytic reactor device 60, e.g., between the first and second coated substrates 61 and 63 of the hydrocarbon-selective catalytic reactor device 60 to determine an operating temperature thereat. When the second temperature monitoring sensor 64 is inserted between the first and second coated substrates 61 and 63, the first and second temperature monitoring sensors monitor a front half of the hydrocarbon-selective catalytic reactor device 60 when the first and second coated substrates 61 and 63 have the same volumetric displacement, e.g., measured in liters. Alternatively, the second temperature monitoring sensor 64 can monitor temperature at a rearward position of the hydrocarbon-selective catalytic reactor device 60 to determine an operating temperature thereat. The second temperature monitoring sensor 64 can be configured to monitor temperature of the exhaust gas feedstream, and alternatively can be configured to monitor temperature of the hydrocarbon-selective catalytic reactor device 60 at a specific location defined along the longitudinal flow axis 67.

The locations of the first and second temperature monitoring sensors 62 and 64 define the monitored portion of the hydrocarbon-selective catalytic reactor device 60. The monitored portion of the hydrocarbon-selective catalytic reactor device 60 is preferably a volumetric displacement of the linear portion of the substrate located between the first and second temperature monitoring sensors 62 and 64. Volumetric displacement as used herein is represented by the cross sectional area of the substrate multiplied by the length of the monitored portion. The volumetric displacement of the monitored portion of the hydrocarbon-selective catalytic reactor device 60 can be used in conjunction with the exhaust mass airflow to determine a monitored space velocity.

The control system preferentially operates the internal combustion engine 10 at an air-fuel ratio that is lean of stoichiometry while monitoring operation of the internal combustion engine 10 and the exhaust gas feedstream. The monitored parameters of the engine 10 and the exhaust gas feedstream preferably include exhaust mass airflow, constituent concentrations in the exhaust gas feedstream, e.g., NOx, and the temperature differential $\Delta T$ across the monitored portion of the hydrocarbon-selective catalytic reactor device 60 measured using the first and second temperature monitoring sensors 62 and 64.

Figure 2:
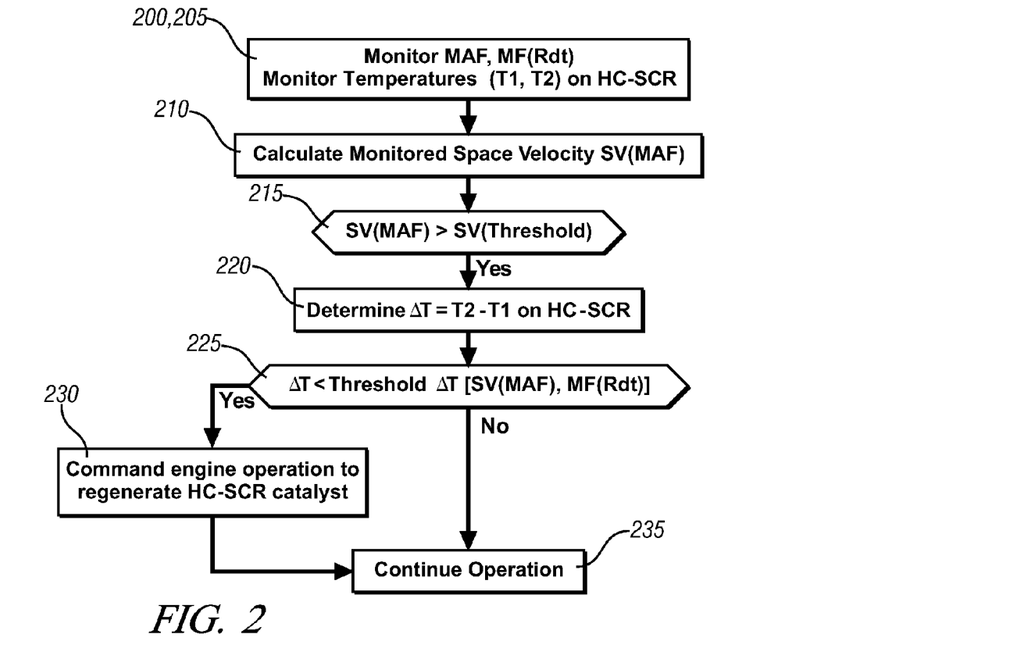
FIG. 2 is a logic flow diagram in accordance with the present disclosure.

FIG. 2 shows a control scheme 200 executed as a logic flowchart for controlling operation of the internal combustion engine 10 including monitoring operation of the hydrocarbon-selective catalytic reactor device 60 of the exhaust aftertreatment system 45 of the internal combustion engine 10. The control scheme 200 includes executing algorithmic code to operate the engine 10 and monitor signal inputs from the aforementioned sensors to control operation of the reductant dispensing system 55.

The exhaust mass airflow (MAF) and a commanded reductant mass flowrate (MF(Rdt)) for dispensing into the exhaust gas feedstream upstream of the hydrocarbon-selective catalytic reactor device 60 are determined, and temperatures T1 and T2 are monitored using the first and second temperature monitoring sensors 62 and 64 respectively (205). The exhaust mass airflow (MAF) can be determined by monitoring the intake mass airflow using the mass airflow device and allowing for a lag time associated with airflow transport through the engine 10. Alternatively, the intake mass airflow can be calculated based upon engine speed, load and engine displacement. The NOx concentration in the exhaust gas feedstream can be determined based upon intake mass airflow, engine air-fuel ratio, monitored NOx concentration in the exhaust gas feedstream, and other related factors. The commanded reductant mass flowrate (MF(Rdt)) is associated with the NOx concentration in the exhaust gas feedstream, and preferably includes a reductant mass flowrate (MF(Rdt)) that achieves a stoichiometric ratio of reductant mass flowrate (MF(Rdt)) and NOx concentration in the exhaust gas feedstream upstream of the hydrocarbon-selective catalytic reactor device 60 to effect an exothermic reaction across the hydrocarbon-selective catalytic reactor device 60.

The space velocity (SV(MAF)) for the monitored portion of the hydrocarbon-selective catalytic reactor device 60 is determined by locations of the first and second temperature monitoring sensors 62 and 64, which define and circumscribe a volumetric displacement of the monitored portion of the hydrocarbon-selective catalytic reactor device 60 and is based upon the exhaust mass airflow (MAF) therethrough (210). The monitored space velocity differs from a space velocity for the entire hydrocarbon-selective catalytic reactor device 60 and is dependent upon the physical placement of the first and second temperature monitoring sensors 62 and 64.

When the monitored space velocity (SV(MAF)) exceeds a threshold space velocity (SV(Threshold)) (215), the control system calculates or otherwise determines the temperature differential $\Delta T$ across the monitored portion of the hydrocarbon-selective catalytic reactor device 60. The temperature differential $\Delta T$ is the difference between the temperatures T2 and T1 as measured using the second and first temperature monitoring sensors 64 and 62, respectively (220). The temperature differential $\Delta T$ is compared to a threshold temperature differential (Threshold($\Delta$T[SV(MAF), MF(Rdt)])) (225). The threshold temperature differential is associated with the commanded reductant mass flowrate (MF(Rdt)) and the monitored space velocity (SV(MAF)) for the monitored portion of the hydrocarbon-selective catalytic reactor device 60.

The combination of operating the engine 10 and injecting a mass flowrate of the hydrocarbon reductant in the exhaust gas feedstream can cause an exothermic reaction across the hydrocarbon-selective catalytic reactor device 60. The magnitude of exothermic reaction across the monitored portion of the hydrocarbon-selective catalytic reactor device 60 is associated with the exhaust mass airflow. The magnitude of the exothermic reaction increases with increasing exhaust mass airflow and decreases with decreasing exhaust mass airflow.

In one embodiment, the temperature differential $\Delta T$ is determined when the engine 10 is operating at an exhaust mass airflow that generates a relatively high monitored space velocity in the hydrocarbon-selective catalytic reactor device 60 with a known reductant mass flowrate. The temperature differential $\Delta T$ is indicative of the exothermic reaction rate across the hydrocarbon-selective catalytic reactor device 60. As the hydrocarbon-selective catalytic reactor device 60 deactivates, e.g., by hydrocarbon poisoning or sulfur poisoning, the exothermic reaction rate decreases. A decrease in the exothermic reaction rate can be measured by the temperature differential $\Delta T$.

Threshold temperature differentials are determined that are associated with decreases in exothermic reaction rates that correspond to decreased NOx conversion efficiency of the hydrocarbon-selective catalytic reactor device 60. A plurality of threshold temperature differentials can be determined that are associated with threshold NOx conversion levels, e.g., conversion efficiency (%) that correspond to the monitored space velocity SV(MAF) of the hydrocarbon-selective catalytic reactor device 60 and the commanded reductant mass flowrate (MF(Rdt)]). When the temperature differential $\Delta T$ is less than the threshold temperature differential associated with the monitored space velocity and the commanded reductant mass flowrate, the control system can command engine operation to regenerate the hydrocarbon-selective catalytic reactor device 60. Regenerating the hydrocarbon-selective catalytic reactor device 60 preferably includes operating the engine 10 to induce high temperature in the exhaust gas feedstream and the hydrocarbon-selective catalytic reactor device 60 to burn and otherwise purge hydrocarbon and sulfur therefrom (230). Regenerating the hydrocarbon-selective catalytic reactor device 60 can include post-injecting fuel into the combustion chamber(s) of engine 10 and combusting the post-injected fuel over the first aftertreatment device 50 preferably including an oxidation catalytic device, thereby generating heat in the exhaust aftertreatment system 45.

Subsequently, operating the control system includes monitoring the temperature differential $\Delta T$ across the monitored portion of the hydrocarbon-selective catalytic reactor device 60 measured using the first and second temperature monitoring sensors 62 and 64 (235).

FIGS. 3-7 graphically depict results associated with laboratory reactor measurements using sample catalytic devices. The laboratory reactor measurements correspond to operating an exemplary hydrocarbon-selective catalytic reactor device 60 illustrative of the method and system described herein. The sample catalytic devices included reactor samples constructed using Ag—Al as catalytic material and including 2 wt. % $Ag_2O$ supported on alumina The catalytic devices were constructed of catalytic material supported on 63 cells per square centimeter (400 cells per square inch) cordierite monolith substrates. The catalytic devices were hydro-thermally aged employing air and 10% water at 650° C. for 16 hours prior to testing.

Representative data graphs depict results achieved by selectively injecting HC fuel upstream of the exemplary Ag—Al catalytic devices are shown. The results depicted in the data graphs were developed using a laboratory reactor to flow a simulated exhaust gas feedstream over the exemplary catalytic devices. The aftertreatment system was instrumented with sensors including temperature sensors, a magneto-pneumatic exhaust gas analyzer to determine $O_2$ concentration in the exhaust, a Fourier transform infrared spectrometer or chemi-luminescent exhaust gas analyzer to determine NOx concentration levels entering and exiting the catalytic devices, and a flow meter to determine exhaust mass airflow translatable to catalyst space velocity (SV). As is known, space velocity represents a time-rate of exhaust airflow, in volume, per unit volume of the Ag—Al catalytic device or portion thereof, and has units of inverse time, e.g., inverse hour ($h^{-1}$ or 1/h).

The simulated exhaust feedstream included the following standard gases: 10% $O_2$, 5% $CO_2$, 5% $H_2O$, 750 parts per million (hereinafter 'ppm') CO, 250 ppm $H_2$, and 250 ppm NO. A simulated diesel fuel mixture consisting of a volumetric mixture of n-dodecane (67 vol. %, long-chain alkane) and m-xylene (33 vol. %, aromatic) was used as the NOx reductant. The effect of space velocity and associated concentration effects of $O_2$, $H_2$, and HC were evaluated as a function of inlet and outlet temperatures.

Figure 3:
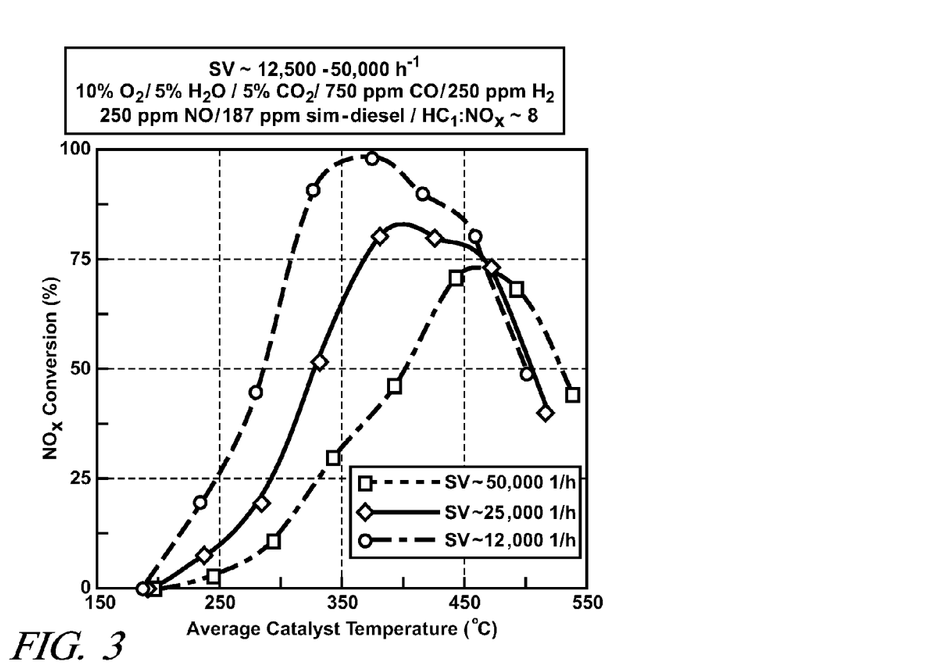
FIGS. 3-12 are datagraphs in accordance with the present disclosure.

FIG. 3 graphically depicts test results showing NOx conversion efficiency in percent (%) across the sample of the Ag—Al catalytic device, plotted as a function of average temperature (C) wherein SV was 12,500 $h^{-1}$, 25,000 $h^{-1}$, or 50,000 $h^{-1}$ with an exhaust gas feedstream including 10% $O_2$, 5% $H_2O$, 5% $CO_2$, 750 ppm CO, 250 ppm $H_2$, 250 ppm NO, and 187 ppm sim-diesel to provide a $HC_1$:NOx ratio of approximately 8.

Figure 4:
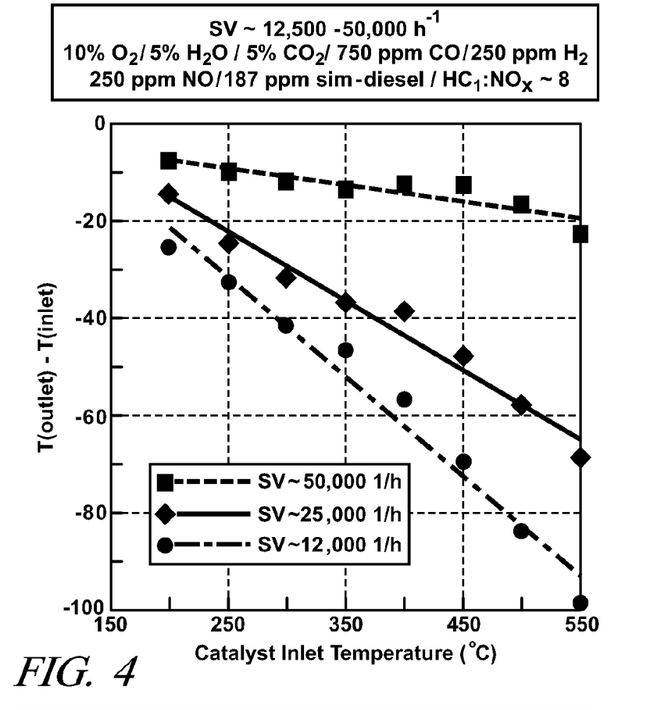

FIG. 4 graphically depicts test results showing a temperature difference [T (outlet)–T (inlet)] across the sample of the Ag—Al catalytic device plotted as a function of inlet temperature (° C.). The temperature difference [T (outlet)–T (inlet)] across the sample of the Ag—Al catalytic device corresponds to the aforementioned temperature difference measured between the first and second temperature monitoring sensors 62 and 64 configured to monitor a portion of the hydrocarbon-selective catalytic reactor device 60. Exemplary space velocities include 12,500 h$^{-1}$, 25,000 h$^{-1}$, or 50,000 h$^{-1}$ with an exhaust gas feedstream including 10% $O_2$, 5% $H_2O$, 5% $CO_2$, 750 ppm CO, 250 ppm $H_2$, 250 ppm NO, and 187 ppm sim-diesel to provide a $HC_1$:NOx ratio of approximately 8.

Figure 5:
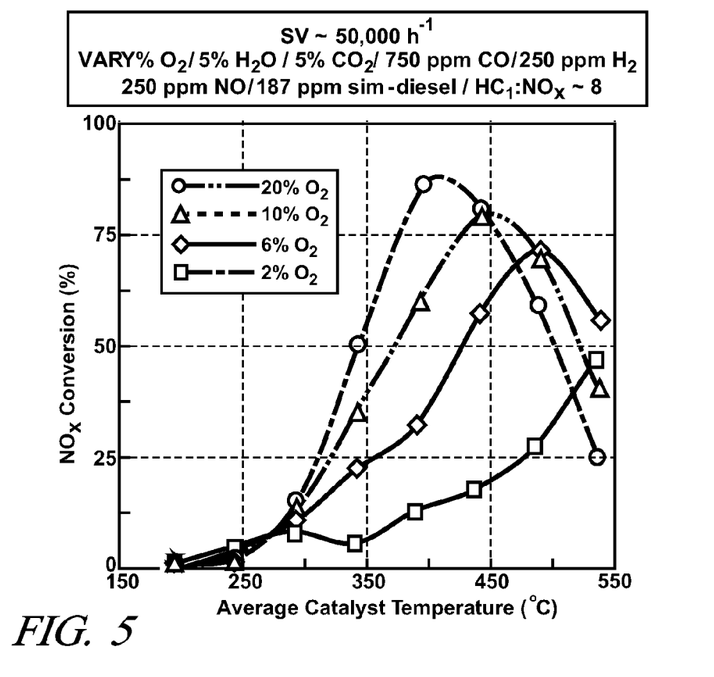

FIG. 5 graphically depicts test results showing NOx conversion efficiency in percent (%) across the sample of the Ag—Al catalytic device, plotted as a function of average temperature (C) wherein SV was 50,000 h$^{-1}$ with an exhaust gas feedstream including 2 to 20% $O_2$, 5% $H_2O$, 5% $CO_2$, 750 ppm CO, 250 ppm $H_2$, 250 ppm NO, and 187 ppm sim-diesel to provide a $HC_1$:NOx ratio of approximately 8.

Figure 6:
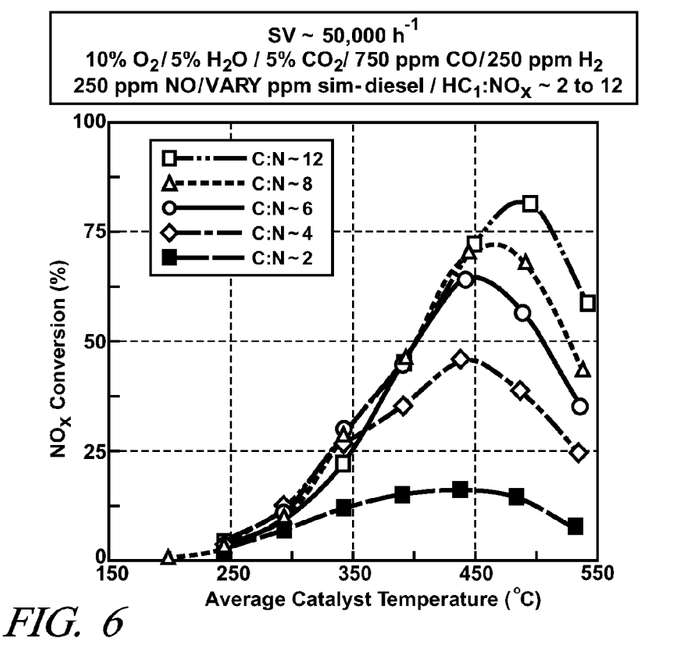

FIG. 6 graphically depicts test results showing NOx conversion efficiency in percent (%) across the sample of the Ag—Al catalytic device, plotted as a function of average temperature (C) wherein SV was 50,000 h$^{-1}$ with an exhaust gas feedstream including 10% $O_2$, 5% $H_2O$, 5% $CO_2$, 750 ppm CO, 250 ppm $H_2$, 250 ppm NO, and variable amounts of sim-diesel to provide $HC_1$:NOx ratios (C:N) over a range between approximately 2 and 12.

Figure 7:
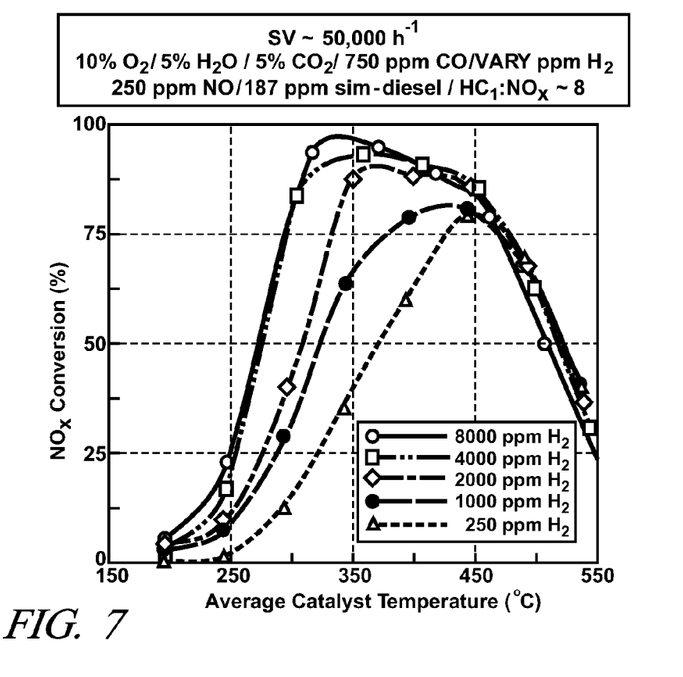

FIG. 7 graphically depicts test results showing NOx conversion efficiency in percent (%) across the sample of the Ag—Al catalytic device, plotted as a function of average temperature (C) wherein SV was 50,000 h$^{-1}$ with an exhaust gas feedstream including 10% $O_2$, 5% $H_2O$, 5% $CO_2$, 750 ppm CO, 250 to 8000 ppm $H_2$, 250 ppm NO, and 187 ppm sim-diesel to provide $HC_1$:NOx ratios of approximately 8.

Results presented with reference to FIGS. 3-7 indicate that the NOx conversion efficiency across an Ag—Al catalytic device is affected by the exhaust mass flowrate and hence the space velocity, the exhaust feedstream oxygen concentration, the reductant mass flowrate injected into the exhaust feedstream, the exhaust feedstream hydrogen concentration, and the inlet temperature. The chemical reaction across the Ag—Al catalytic device is exothermic, meaning the chemical reaction gives off heat to the surroundings. However, the extent of this heat transfer is dependent on the exhaust mass airflow, with higher flow rates more effectively transferring the heat to the outlet gas temperature behind the Ag—Al catalytic device, particularly at temperatures above 350° C. Under a fixed high exhaust mass airflow corresponding to a SV of 50,000 h$^{-1}$, increasing NOx conversion efficiency over the hydrocarbon-selective catalytic reactor device 60 with increasing $O_2$, HC reductant, and $H_2$ concentrations corresponds to an increasing exothermic reaction thereacross as indicated by increasing outlet gas temperature, which can be measured using the second temperature monitoring sensor 64. Increasing the $H_2$ concentration in the exhaust feedstream is effective at generating a large exothermic reaction over the Ag—Al catalytic device. Operating parameters such as engine speed/load, EGR position and flowrate, and HC reductant injection rate determine the inlet temperature, exhaust mass airflow and associated space velocity (SV), and $O_2$ and HC concentrations entering the Ag—Al catalytic device. Therefore, selection of an appropriate engine operating condition during which the exothermic reaction is preferably measured is required.

Figure 8:
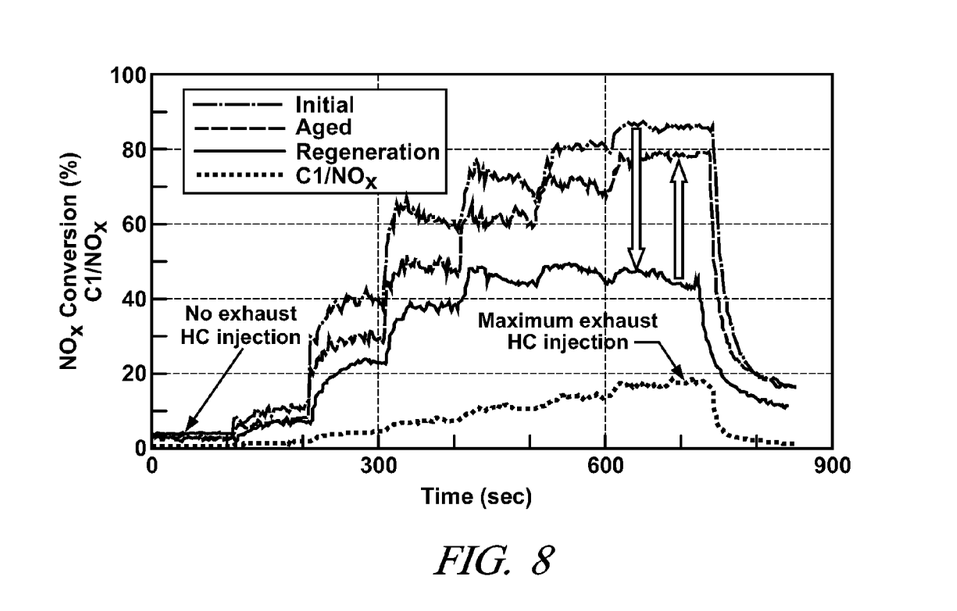

FIG. 8 graphically depicts test results showing NOx conversion efficiency (%) and the $HC_1$:NOx ratios (C1:NOx) across a sample of an Ag—Al catalytic device, plotted as a function of time (sec). Diesel fuel was used to provide the $C_1$:NOx ratios under conditions of steady-state engine operation. Results are shown for initial catalyst performance, i.e., prior to aging, after aging including poisoning with 330 ppm sulfur fuel, and after high temperature regeneration. The results indicate that NOx conversion efficiency can be recovered subsequent to sulfur deactivation by regenerating the catalytic device at elevated temperatures (e.g., 500° C.). The deactivation of the Ag—Al catalytic device due to diesel fuel poisoning (e.g., as shown in FIG. 8) occurs more predominantly in a front or forward portion of the Ag—Al catalytic device than in a rearward portion thereof Thus measurement of exothermic reactions in the front portion of the hydrocarbon-selective catalytic reactor device provides information useable for monitoring and diagnostics to determine frequency of regeneration events.

Figure 9:
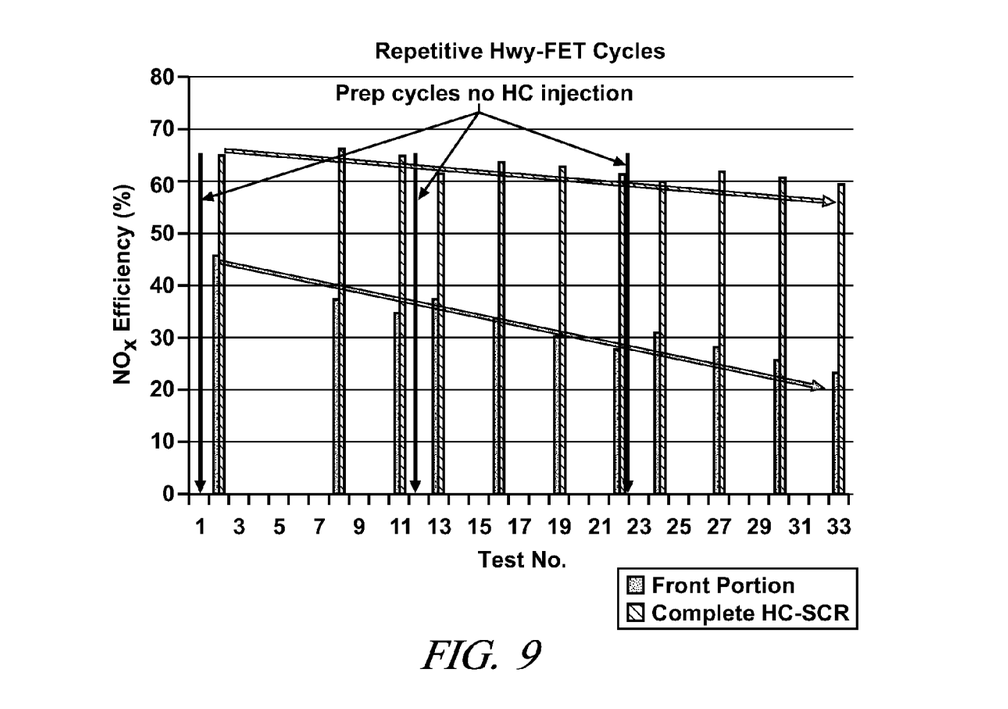

FIG. 9 graphically depicts test results over elapsed time for an exemplary system constructed as described herein, and include NOx conversion efficiency (%) for a plurality of repetitively conducted tests. Each test is a standard highway fuel economy test (Hwy-FET Cycles). Data is depicted for NOx conversion efficiency over a front half portion of the hydrocarbon-selective catalytic reactor device 60 (Front Portion Only), e.g., substrate 61 shown in FIG. 1, and NOx conversion efficiency over the complete hydrocarbon-selective catalytic reactor device 60 (Complete HC-SCR). The results indicate that the front half portion deactivates at a faster rate than a rear half portion, e.g., substrate 63 shown in FIG. 1. The monitored space velocity of the front half portion is half that of the complete hydrocarbon-selective catalytic reactor device 60 due to the lower monitored volume of catalyst. Hence a temperature measurement across the front half portion of the hydrocarbon-selective catalytic reactor device 60 indicates when NOx conversion activity has fallen to a level requiring catalyst regeneration.

Figure 10:
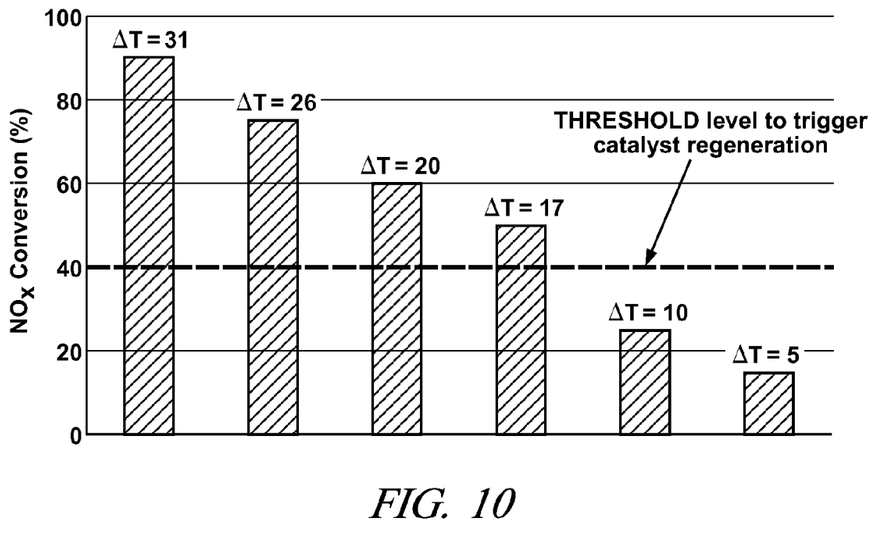

FIG. 10 graphically depicts NOx conversion efficiency (%) and corresponding temperature differentials ($\Delta T$) across a hydrocarbon-selective catalytic reactor device, determined during service life of a system. This indicates that there is a correlation between NOx conversion efficiency (%) and the temperature differential ($\Delta T$). Thus catalyst regeneration can be triggered when the temperature differential ($\Delta T$) falls below a threshold that corresponds to a threshold NOx conversion efficiency, e.g., a temperature differential $\Delta T$ of about 14 corresponding NOx conversion efficiency of 40%, which can be a threshold NOx conversion efficiency level.

Figure 11:
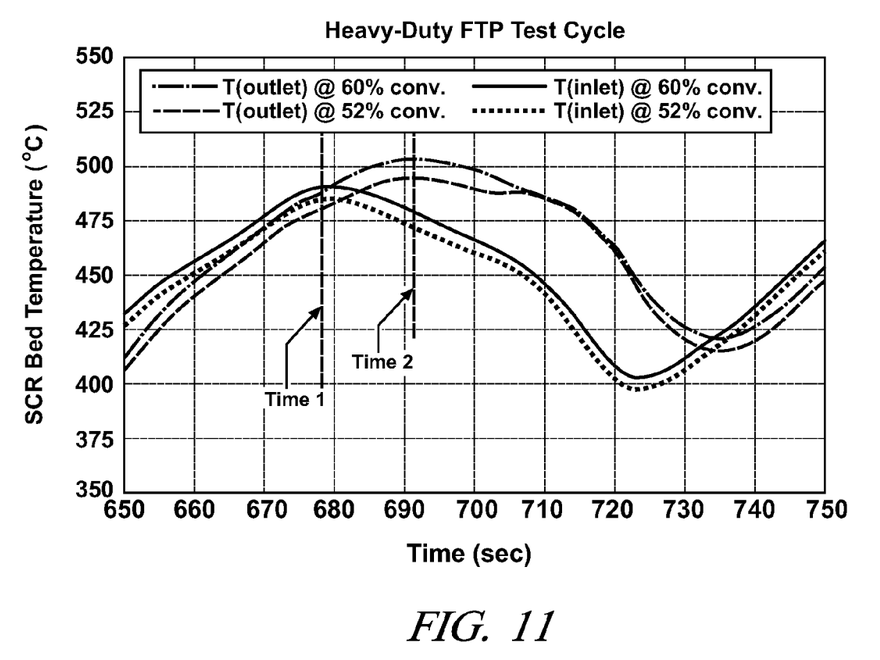

FIG. 11 graphically depicts inlet and outlet temperatures for an engine with an aftertreatment system including a hydrocarbon-selective catalytic reactor device executing a Heavy-Duty FTP Test Cycle on an engine dynamometer. The hydrocarbon-selective catalytic reactor device operates at a 60% NOx conversion efficiency and subsequently at a 52% NOx conversion efficiency at a monitored space velocity of about 99,000 h$^{-1}$. The results include a peak or maximum inlet temperature (T(inlet)) and a subsequently occurring peak or maximum outlet temperature (T(outlet)). A temperature differential $\Delta T$ is calculated as a difference between a peak outlet temperature and a previously occurring peak inlet temperature, which occur at times Time1 and Time2 respectively. The temperatures are measured during operation at both the 60% NOx conversion efficiency and the 52% NOx conversion efficiency.

Figure 12:
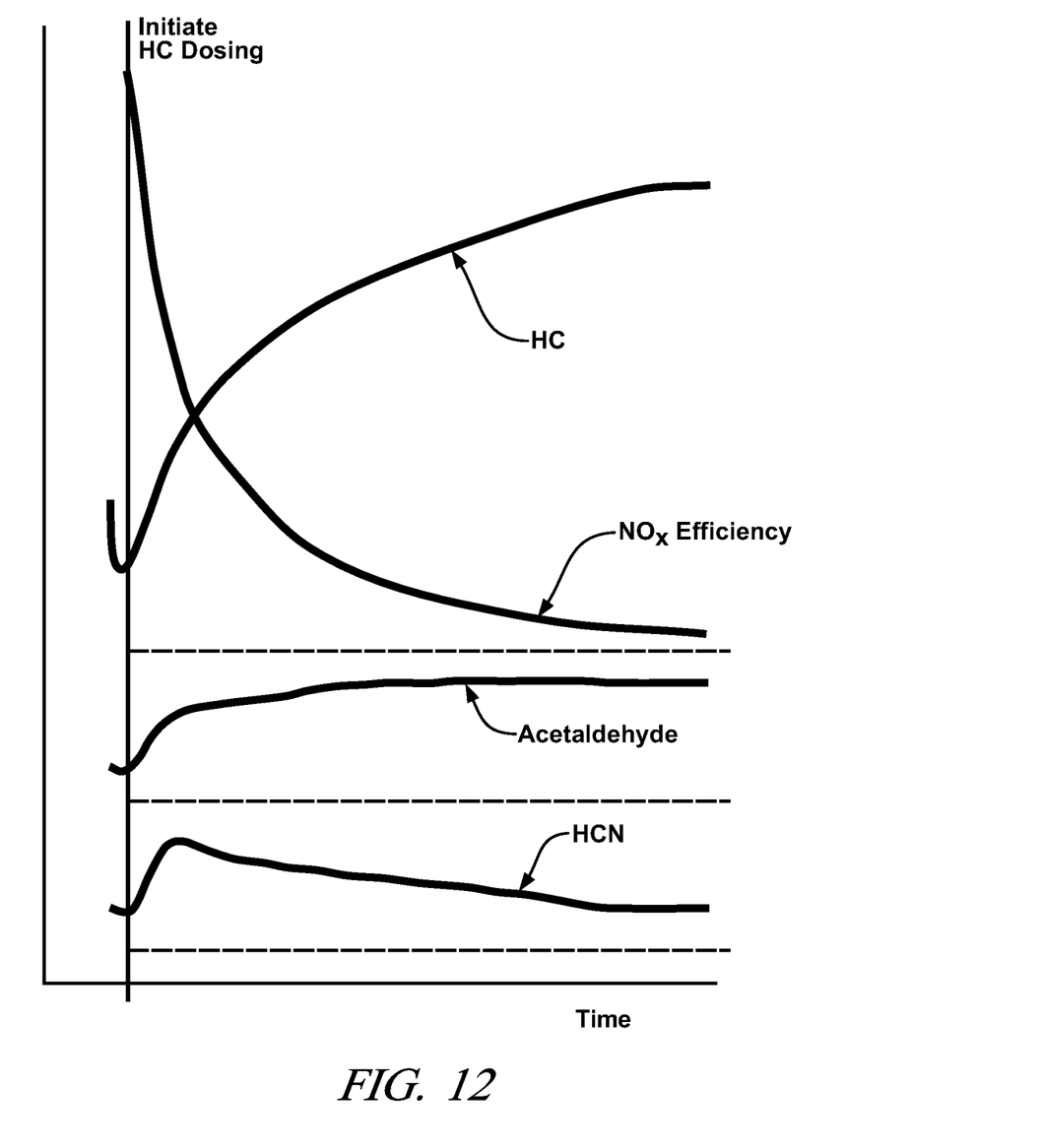

FIG. 12 graphically depicts measurement of NOx conversion efficiency across a hydrocarbon-selective catalytic reactor device over an elapsed time period during which hydrocarbon reductant is dispensed upstream. Corresponding measurements of hydrocarbons (HC), acetaldehyde (Acetaldehyde), and hydrogen cyanide (HCN) are also shown. These results indicate that alternative sensing devices 66 to indicate change in NOx conversion efficiency across the hydrocarbon-selective catalytic reactor device 60 can include a device configured to monitor any one of hydrocarbons, acetaldehyde, and hydrogen cyanide placed downstream of the hydrocarbon-selective catalytic reactor device 60. Concentration measurements can be made, e.g., concentrations of hydrocarbons, NOx, hydrogen cyanide, and/or acetaldehyde to monitor the catalyst activity level based on the concentration(s) measured under a high exhaust mass airflow. The concentration measurement indicates catalyst activation, and thereby allows determination of the level of catalyst deactivation, e.g., due to poisoning by hydrocarbons and/or sulfur that has occurred relative to a prior measurement.

Thus catalyst regeneration can be triggered when a corresponding concentration measurement, e.g., a concentration of one of hydrocarbons, NOx, hydrogen cyanide, and acetaldehyde falls below a threshold that corresponds to a threshold NOx conversion efficiency. The control scheme commands regenerative operation to regenerate specific devices of the exhaust aftertreatment system 45. The control scheme can be used to determine an extent to which the catalyst NOx conversion efficiency has been recovered after regeneration based upon the concentration measurement alone, or in conjunction with the monitored temperature.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a hydrocarbon-selective catalytic reactor device of an exhaust aftertreatment system of an internal combustion engine operating lean of stoichiometry, comprising:
   monitoring an intake mass airflow and determining an associated exhaust mass airflow;
   determining a temperature differential across only a forward portion of the hydrocarbon-selective catalytic reactor device;
   determining a monitored space velocity associated with the exhaust mass airflow across only the forward portion of the hydrocarbon-selective catalytic reactor device;
   injecting a reductant into an exhaust gas feedstream upstream of the hydrocarbon-selective catalytic reactor device including commanding a mass flowrate of the reductant that achieves a stoichiometric NOx concentration/reductant ratio in relation to the NOx concentration in the exhaust gas feedstream;
   determining a measure of deactivation of the forward portion of the hydrocarbon-selective catalytic reactor device corresponding to the temperature differential across only the forward portion of the hydrocarbon-selective catalytic reactor device and the monitored space velocity during said injecting the reductant; and
   controlling operation of the engine based upon the measure of deactivation of the forward portion of the hydrocarbon-selective catalytic reactor device.

2. The method of claim 1, wherein controlling operation of the engine based upon the measure of deactivation of the hydrocarbon-selective catalytic reactor device comprises:
   determining a NOx conversion efficiency associated with the measure of deactivation of the forward portion of the hydrocarbon-selective catalytic reactor device; and
   operating the engine to regenerate the hydrocarbon-selective catalytic reactor device when the NOx conversion efficiency of the forward portion of the hydrocarbon-selective catalytic reactor device is less than a threshold.

3. The method of claim 2, wherein operating the engine to regenerate the hydrocarbon-selective catalytic reactor device includes operating the engine to induce an elevated temperature in the exhaust gas feedstream.

4. The method of claim 1, wherein determining the temperature differential across only the forward portion of the hydrocarbon-selective catalytic reactor device comprises monitoring a first temperature at a forward position of the hydrocarbon-selective catalytic reactor device and monitoring a second temperature at a middle position in the hydrocarbon-selective catalytic reactor device.

5. The method of claim 1, wherein injecting the reductant into the exhaust gas feedstream comprises injecting the reductant at a mass flowrate that effects an exothermic reaction across the hydrocarbon-selective catalytic reactor device.

6. Method for monitoring a hydrocarbon-selective catalytic reactor device contained in an exhaust aftertreatment system of an internal combustion engine operating lean of stoichiometry, comprising:
   determining a mass airflow of an exhaust gas feedstream of the internal combustion engine;
   determining NOx concentration in the exhaust gas feedstream;
   injecting a reductant into the exhaust gas feedstream upstream of the hydrocarbon-selective catalytic reactor device at a mass flowrate associated with the mass flowrate of the exhaust gas feedstream and the NOx concentration in the exhaust gas feedstream, including commanding a mass flowrate of the reductant that achieves a stoichiometric NOx concentration/reductant ratio in relation to the NOx concentration in the exhaust gas feedstream;
   determining a temperature differential across a portion of the hydrocarbon-selective catalytic reactor device;
   determining a space velocity associated with the mass flowrate of the exhaust gas feedstream across the portion of the hydrocarbon-selective catalytic reactor device;
   determining a magnitude of deactivation of the portion of the hydrocarbon-selective catalytic reactor device corresponding to the temperature differential across the portion of the hydrocarbon-selective catalytic reactor device and the space velocity; and
   operating the internal combustion engine to regenerate the hydrocarbon-selective catalytic reactor device when the magnitude of deactivation of the portion of the hydrocarbon-selective catalytic reactor device exceeds a threshold.

7. The method of claim 6, wherein determining the temperature differential across a portion of the hydrocarbon-selective catalytic reactor device comprises monitoring first and second temperatures in first and second locations relative to a longitudinal axis of the hydrocarbon-selective catalytic reactor device, the first and second locations defining the portion of the hydrocarbon-selective catalytic reactor device.

8. The method of claim 7, wherein monitoring the first and second temperatures in first and second locations relative to the longitudinal axis of the hydrocarbon-selective catalytic reactor device comprises monitoring the first temperature at a front position of a first substrate of the hydrocarbon-selective catalytic reactor device and monitoring the second temperature at a rear position of the first substrate of the hydrocarbon-selective catalytic reactor device.

9. Method for monitoring a hydrocarbon-selective catalytic reactor device of an exhaust aftertreatment system of an internal combustion engine operating lean of stoichiometry, comprising:
   injecting a reductant into an exhaust gas feedstream upstream of the hydrocarbon-selective catalytic reactor device at a predetermined mass flowrate of the reductant, the predetermined mass flowrate of the hydrocarbon reductant commanded to achieve a stoichiometric NOx concentration/reductant ratio in relation to the NOx concentration in the exhaust gas feedstream;

determining a space velocity associated with only a predetermined forward portion of the hydrocarbon-selective catalytic reactor device; and when the space velocity exceeds a threshold space velocity:

determining a temperature differential across only the predetermined forward portion of the hydrocarbon-selective catalytic reactor device, determining a threshold temperature as a function of the space velocity and the commanded mass flowrate of the reductant, and if the temperature differential across only the predetermined forward portion of the hydrocarbon-selective catalytic reactor device is below the threshold temperature, controlling operation of the engine to regenerate the hydrocarbon-selective catalytic reactor device.

10. The method of claim 9 wherein determining the space velocity associated with the predetermined forward portion of the hydrocarbon-selective catalytic reactor device comprises determining an exhaust mass airflow and determining the space velocity as a function of the exhaust mass airflow.

11. The method of claim 10 wherein determining the exhaust mass airflow comprises determining an engine intake mass airflow and determining the exhaust mass airflow as a function of the engine intake mass airflow.

* * * * *